United States Patent [19]

ten Berge

[11] Patent Number: 4,662,710
[45] Date of Patent: May 5, 1987

[54] METHOD AND APPARATUS FOR BREAKING AN OPTICAL FIBER

[75] Inventor: Eduardus F. A. ten Berge, Drunen, Netherlands

[73] Assignee: AMP Incorporated, Harrisburg, Pa.

[21] Appl. No.: 551,525

[22] Filed: Nov. 14, 1983

[30] Foreign Application Priority Data

Dec. 3, 1982 [UK] United Kingdom ............ 8234545

[51] Int. Cl.⁴ .......................... G02B 6/00; B26F 3/00; B26F 3/02; B65F 35/00
[52] U.S. Cl. .................. 350/96.10; 350/96.29; 350/96.30; 350/320; 225/1; 225/2; 225/96.5; 225/97; 225/103; 225/104; 225/105; 65/10.2; 65/174
[58] Field of Search ............. 350/96.10, 96.15, 96.20, 350/96.21, 96.29, 96.30, 320; 225/1, 2, 3, 4, 5, 103, 104, 105, 106, 96.5, 97; 65/10.2, 174, 176

[56] References Cited

U.S. PATENT DOCUMENTS

| | | | |
|---|---|---|---|
| 3,934,773 | 1/1976 | Chinnock et al. | 225/2 |
| 4,027,814 | 6/1977 | Gloge et al. | 225/104 |
| 4,216,004 | 8/1980 | Brehm et al. | 65/2 |
| 4,322,025 | 3/1982 | Johnson | 225/96.5 |
| 4,428,518 | 1/1984 | Abel | 225/103 |
| 4,474,319 | 10/1984 | Walker | 225/96.5 |
| 4,502,620 | 3/1985 | Leiby | 225/101 |

FOREIGN PATENT DOCUMENTS 56-146102 11/1981 Japan ................. 350/96.20

OTHER PUBLICATIONS

Uberbacher, "Cutting Tool for Optical Fiber Ribbon Cable", IBM Tech. Discl. Bull., vol. 21, No. 10, 3/79, pp. 4142–4143.

Primary Examiner—William L. Sikes
Assistant Examiner—Brian M. Healy
Attorney, Agent, or Firm—F. W. Raring

[57] ABSTRACT

A method of breaking an optical fiber comprises the steps of surrounding the fiber with elastomeric material in the region of the desired break location and then compressing the elastomeric material towards the axis of the fiber. When the material is compressed, it grips the fiber so that the fiber and the material cannot move relative to each other. Compression of the material also results in elongation of the material so that the fiber is placed in tension and fractures at the desired break point. An apparatus for carrying out the processes is also disclosed.

9 Claims, 7 Drawing Figures

U.S. Patent   May 5, 1987   Sheet 1 of 3   4,662,710
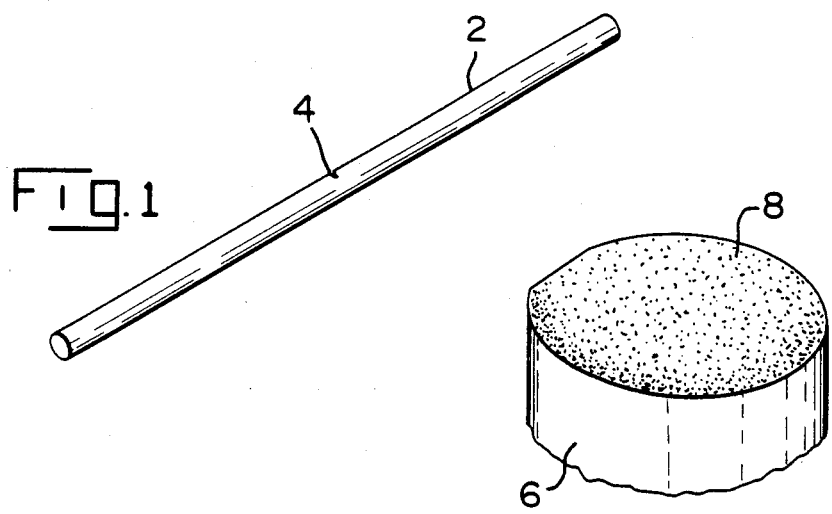
Fig.1
Fig.2
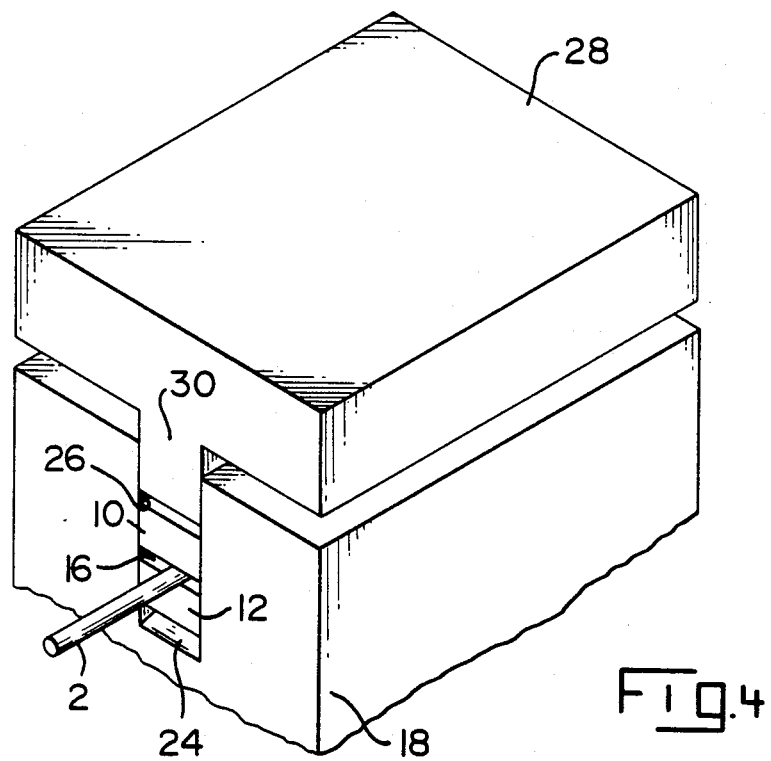
Fig.4

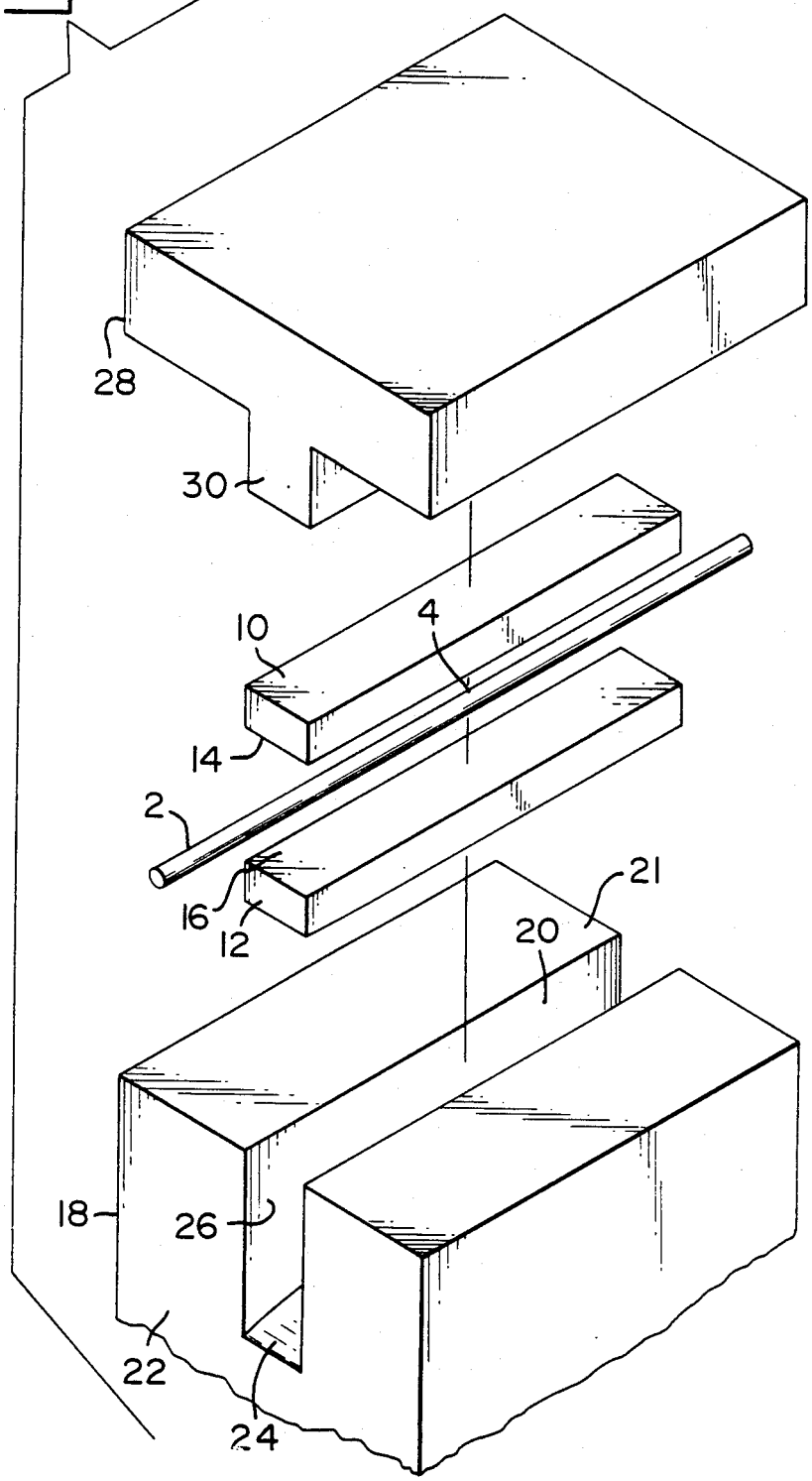

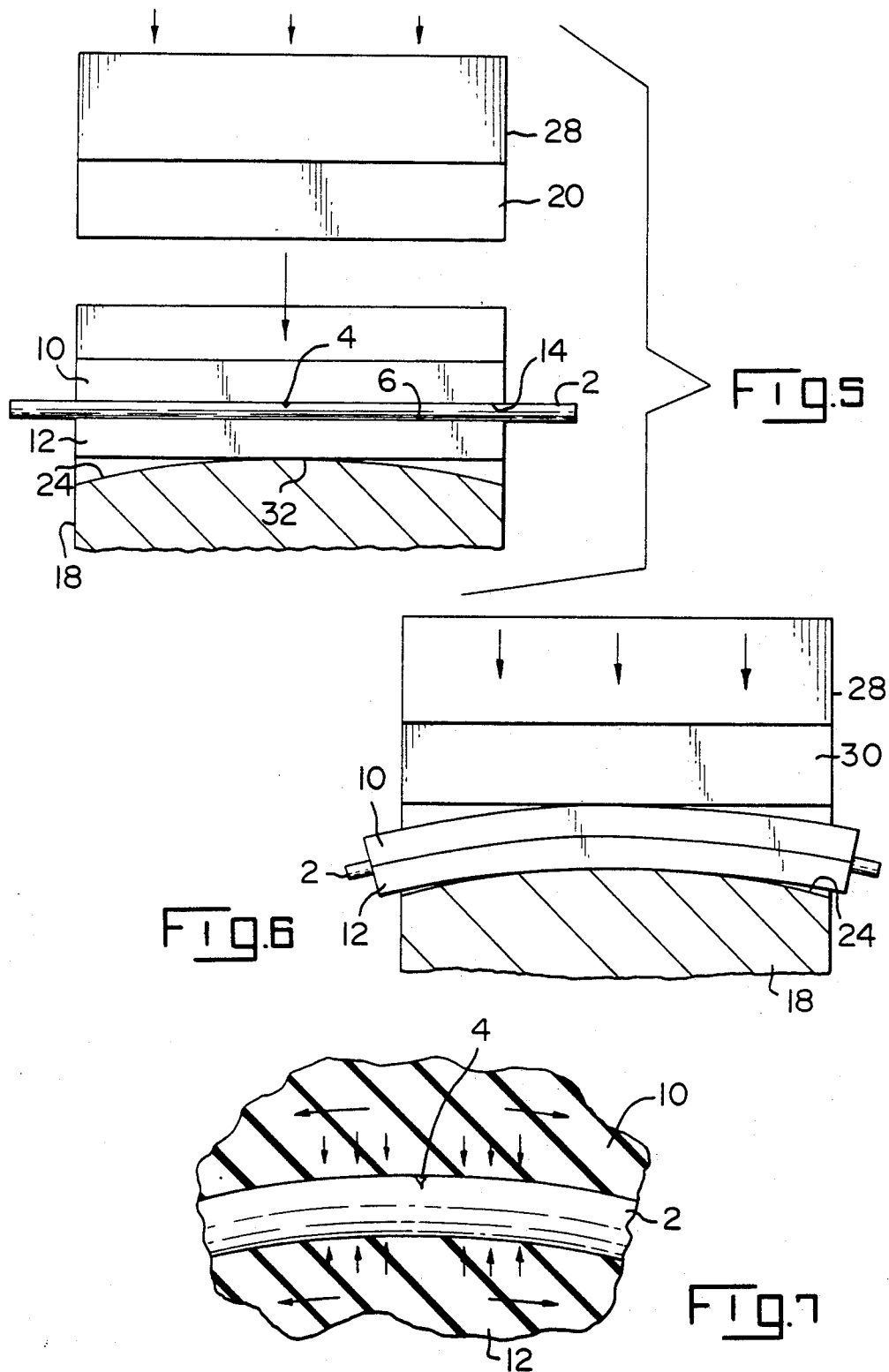

METHOD AND APPARATUS FOR BREAKING AN OPTICAL FIBER

FIELD OF INVENTION

This invention relates to methods and apparatus for breaking optical fibers in a way such that the surface of the fractured fiber extends substantially normally of the axis of the fiber.

BACKGROUND OF THE INVENTION

A known method of breaking or fracturing an optical fiber in a controlled manner is to weaken the fiber at the desired break location and then stress the fiber in tension so that a crack travels from the weakened zone across the axis of the fiber. U.S. Pat. No. 4,027,814 describes a particular method and apparatus in which the fiber is flexed very slightly when it is broken and the speed of propagation of the crack is controlled in a manner which produces a smooth fractured surface. The achievement of a smooth surface is desirable for the reason that such a surface can be placed against a similar surface on another fiber to form a splice and it is not necessary to polish the surfaces when an optical splice is made.

While it is important to have an optically smooth surface in a splice of fiber optic members, it is also important that the opposed surfaces of the optical fibers be parallel to each other or nearly so. Parallelism or substantial parallelism in the surfaces of the fibers in a splice is desirable for the reason that any departure from substantial parallelism results in serious losses in the splice.

The known methods of fracturing or breaking optical fibers do not produce fractured surfaces which are satisfactory from the standpoint of the fracture angle of the surface (the fracture angle being the departure of the surface from a surface which would extend normally of the fiber axis). The present invention is directed to the achievement of a method and apparatus for breaking optical fibers which will result in improvements in the quality of the fracture as related to the fracture angle. The invention is furthered directed to the achievement of a method and apparatus for breaking optical fibers which will produce a satisfactory surface insofar as smoothness is concerned.

A preferred embodiment of the invention comprises a method of breaking an optical fiber in which the fiber is weakened at the desired break location and the fiber is then stressed to cause the fiber to break at the desired break location. The method is characterized in that elastomeric material is placed in surrounding relationship to a portion of the fiber extending from the desired break location in opposite directions along the axis of the fiber so that the elastomeric material has ends which are spaced from the desired break location. The elastomeric material is compressed radially towards the axis of the fiber so that the interface surfaces of the fiber and the elastomeric material are pressed against each other to the extent that relative movement of the fiber and the elastic material is prevented and the elastomeric material is elongated as a result of the compression. As a result, the fiber is placed in tension causing the fiber to break by propagation of a crack from the desired break location across the diameter of the fiber. In accordance with a further embodiment, the elastomeric material is compressed by first applying radially directed compressive forces to a limited zone of the elastomeric material at the desired break location of the fiber, and the zone of application of the compressive forces is progressively increased in both axial directions from the location of the desired break location.

An apparatus in accordance with the invention comprises a body of elastomeric material having a fiber-receiving opening extending therethrough between its ends and having major surfaces which extend parallel to the fiber-receiving opening and between the ends. An actuator having force applying surfaces is provided for applying compressive forces to the major surfaces of the body of elastomeric material whereby, upon placement of the optical fiber in the fiber-receiving opening of the body of elastomeric material with the desired break location substantially mid-way between the ends thereof and upon the imposition of compressive forces to the major surfaces of the body of elastomeric material, the body of elastomeric material will be compressed onto the optical fiber and will be elongated, and the optical fiber will thereby be gripped in the body of elastomeric material, and the optical fiber will be placed in tension and a crack will travel across the fiber at the desired break location. The body of elastomeric material may comprise at least two blocks of elastomeric material in side-by-side juxtaposed relationship, the two blocks having opposed surfaces with the fiber-receiving opening being on the opposed surfaces. In accordance with a further embodiment, the force-applying surfaces of the actuator are shaped to impart a curvature to at least portions of the body of elastomeric material in the vicinity of the desired break location of a fiber held in the fiber receiving opening during the application of compressive forces to the major surfaces.

BRIEF DESCRIPTION OF THE DRAWINGS

FIG. 1 is a perspective view of an optical fiber.

FIG. 2 is an enlarged view of the end portion of an optical fiber showing a fractured surface.

FIG. 3 is a perspective view of an apparatus for carrying out the method of the invention, this view showing the parts of the apparatus exploded from each other.

FIG. 4 is a view similar to FIG. 3 but showing the positions of the parts when they are assembled to each other for carrying out a fiber breaking operation.

FIG. 5 is a cross-sectional view looking in the direction of the arrows 5—5 of FIG. 3 but with the elastomeric blocks positioned in the recess in the lower force applying block.

FIG. 6 is a view similar to FIG. 5 but showing the positions of the parts when a fiber is being compressed and is on the verge of breaking.

FIG. 7 is an enlarged diagrammatic view which illustrates the tension and compression forces which are established in the optical fiber and in the elastomeric blocks when the process is carried out.

PREFERRED EMBODIMENT

FIG. 1 shows an optical fiber 2 having a notch 4 therein at the location of a desired break in the fiber. The notch 4 is formed by scribing or by etching or other methods and is formed in preparation for breaking the fiber so that when the fiber is placed in tension, a crack will travel across the fiber from the notch. FIG. 2 shows the end portion 6 of a fiber which has been fractured or broken and which has a fractured surface 8. Ideally, this surface should extend normally with respect to the fiber axis although it is difficult to avoid a very slight fracture angle; a fracture angle of one degree or less can be tolerated when optical splices are being produced.

It is also desirable that the surface 8 be a mirror type surface as described in the above identified U.S. Pat. No. 4,027,814. A mirror type surface is substantially optically smooth and results in minimum loss when a splice is formed and the ends of the optical fibers both have mirror surfaces.

The method of the present invention can best be described with reference to the apparatus for carrying out the method as shown in FIGS. 3-6. The apparatus comprises two similar blocks 10, 12 of elastomeric material, such as a rubber, having a Shore hardness of about 60. The blocks 10, 12 have opposed surfaces 14, 16 between which the optical fiber is gripped when the process of the invention is carried out.

The apparatus further comprises a lower force applying block 22 having an upper surface 21 into which extends a recess 20. The recess has an inner end 24 that has a convex surface and has opposed side surfaces 26 that are spaced apart by a distance equal to the width of the elastomeric blocks 10, 12.

An upper compression member 28 is provided which comprises a block having a rib 30 extending from its downwardly facing surface as shown in the drawing. This rib is dimensioned to be received in the recess 20 as shown in FIG. 4.

In the practice of the invention, the block 12 is placed in the recess 20, the optical fiber 2 is placed on the surface 16 of the block 12, and the block 10 is placed over the optical fiber. The notch 4 of the optical fiber is located with reference to the surface 24 such that it is above the highest portion 32 of the convex surface 24 as shown in FIG. 5.

The upper compression member 28 is then moved downwardly and against block 10. Such movement of the upper compressive member results in the imposition of compression forces on the two elastomeric blocks 10, 12. Initially the compressive forces are applied only in a zone on each side of the notch 4 of the fiber 2 but as the block 28 is moved further downwardly, the compressed zone increases in length in both directions from the notch.

Compression of the block 10, 12 causes these blocks to grip the optical fiber 2 as indicated by the vertical arrows in FIG. 7 so that relative movement of the fiber with respect to the blocks 10, 12 cannot take place to any significant extent.

The compression of the blocks 10, 12 also causes them to be elongated at their ends. The elongation takes place in the compressed zone of FIG. 7 and the ends are therefore displaced outwardly. The elongation in both directions of the blocks coupled with the high level of friction at the fiber-rubber interface results in the fiber being placed in tension as indicated by the horizontal arrows on the fiber in FIG. 7. The tension in turn results in the formation and propagation of a crack which travels across the fiber from the notch 4.

The apparatus shown in FIGS. 3-6 is quite small for a typical optical fiber which may have a diameter of 125 microns. The blocks 10, 12 may have a length of 20 mm, a height of about 3 mm, and a width of about 5 mm. The radius of curvature of the surface 24 should be about 25 mm for blocks 12, 12 as described above.

The elastomeric blocks 10, 12 provide a convenient means of surrounding the optical fiber with elastomeric material. As an alternative, the elastomeric material can be provided as a single monolithic block of elastomer having a fiber receiving opening extending therethrough.

In the disclosed embodiment, the surface 24 is convex and the surface of rib 30 is flat so that the fiber is flexed when it is tensioned. U.S. Pat. No. 4,027,814 teaches that such flexure during breaking will control the velocity of propagation of the crack in a manner which will produce a mirror type fracture surface as explained above.

If it is desired to avoid flexure of the fiber for any reason, both surface 24 and the upper compressing surface can be made convex or flat in which case the fiber will remain straight during the fracturing process. When a large number of fibers are broken by the method of the invention, there will be a high incidence of fracture having a fracture angle of 1 degree or less. Previously known methods of breaking optical fibers resulted in a high incidence of fracture angles greater than 1 degree.

I claim:

1. In the method of breaking an optical fiber in which the fiber is weakened at the desired break location and the fiber is then stressed to cause the fiber to break at the desired break location, the method being characterized in that:

elastomeric material is placed in completely surrounding relationship to a portion of the fiber extending from the desired break location in opposite directions along the longitudinal axis of the fiber so that the elastomeric material has ends which are spaced from the desired break location, the elastomeric material is compressed radially towards the axis of the fiber so that the interface surfaces of the fiber and the elastomeric material are pressed against each other to the extent that relative movement of the fiber and the elastic material is prevented, and the elastomeric material is further compressed and elongated in both axial directions away from the desired break location as a result of the compression so that the fiber is placed in tension by the elastomeric material causing the fiber to break by propagation of a crack from the desired break location across the diameter of the fiber.

2. A method of breaking an optical fiber as set forth in claim 1 characterized in that the elastomeric material is compressed by first applying radially directed compressive forces to a limited zone of the elastomeric material at the desired break location of the fiber, and the zone of application of the compressive forces is progressively increased in both axial directions from the desired break location.

3. The method of breaking an optical fiber as set forth in claim 1 characterized in that the fiber is weakened at the desired break location by scribing a notch in the fiber.

4. The method of breaking an optical fiber as set forth in claim 1 characterized in that the elastomeric material is placed in surrounding relationship to a portion of the fiber by placing the portion of the optical fiber between the opposed surfaces of two blocks of elastomeric material.

5. The method of breaking an optical fiber as set forth in claim 4 characterized in that a curvature is imparted to the fiber and to the elastomeric material during compression of the elastomeric material.

6. Apparatus for breaking an optical fiber which has been weakened at the desired break location, the apparatus being of the type which places the fiber in tension so that a crack travels across the fiber at the desired break location, the apparatus comprising:

- a body of elastomeric material having a fiber-receiving opening extending therethrough between its ends and having major surfaces which extend parallel to the fiber-receiving opening and between the ends,
- an actuator having a recess therein for reception of the body of elastomeric material and having force applying surfaces for applying compressive forces of increasing magnitude to the major surfaces of the body of elastomeric material whereby, upon placement of the optical fiber in the fiber-receiving opening of the body of elastomeric material with the desired break location substantially midway between the ends thereof and upon the imposition of compressive forces of increasing magnitude to the major surfaces of the body of elastomeric material, the body of elastomeric material will be compressed onto the optical fiber and will be elongated, and the optical fiber will thereby be gripped in the body of elastomeric material, and the optical fiber will be placed in tension as a result of the elongation of the elastomeric material and a crack will travel across the fiber at the desired break location.

7. Apparatus for breaking an optical fiber as set forth in claim 6 characterized in that the body of elastomeric material comprises at least two blocks of elastomeric material in side-by-side juxtaposed relationship, the two blocks having opposed surfaces, the fiber-receiving opening being on the opposed surfaces.

8. Apparatus for breaking an optical fiber as set forth in claim 6 characterized in that the actuator comprises at least two rigid actuator blocks, one of the actuator blocks having the recess therein which is dimensioned to receive the body of elastomeric material, the other actuator block having a compressing rib which is dimensioned snugly to enter the recess.

9. Apparatus for breaking an optical fiber as set forth in claim 6 characterized in that the force-applying surfaces of the actuator are shaped to impart a curvature to at least portions of the body of elastomeric material in the vicinity of the desired break location of a fiber held in the fiber receiving opening during the application of compressive forces to the major surfaces.

* * * * *